United States Patent [19]

Graul et al.

[11] Patent Number: 4,715,265

[45] Date of Patent: Dec. 29, 1987

[54] PROCESS AND APPARATUS FOR VIBRATORY OPERATION OF A WORKING PISTON, IN PARTICULAR FOR ACTIVE WORKING TOOLS

[75] Inventors: Achim Graul, Wittelsbacherstrasse 42, 8070 Ingolstadt; Elmar Niedermeier, Neuburg/Do.-Ried, both of Fed. Rep. of Germany

[73] Assignee: Achim Graul, Ingolstadt, Fed. Rep. of Germany

[21] Appl. No.: 717,230

[22] PCT Filed: Jul. 21, 1984

[86] PCT No.: PCT/EP84/00227

§ 371 Date: Mar. 22, 1985

§ 102(e) Date: Mar. 22, 1985

[87] PCT Pub. No.: WO85/00762

PCT Pub. Date: Feb. 28, 1985

[30] Foreign Application Priority Data

Aug. 6, 1983 [DE] Fed. Rep. of Germany ....... 3328426

[51] Int. Cl.[4] ......................... F01B 1/00; F16D 31/02

[52] U.S. Cl. ................................... 91/170 R; 91/243; 60/416

[58] Field of Search .............................. 91/170 R, 243

[56] References Cited

U.S. PATENT DOCUMENTS

| | | | |
|---|---|---|---|
| 2,426,409 | 8/1947 | O'Farrell | 91/243 X |
| 2,699,756 | 1/1955 | Miller | 91/170 R X |
| 3,145,488 | 8/1964 | French . | |
| 3,592,107 | 7/1971 | Ahlenius | 91/170 R |
| 4,240,326 | 12/1980 | Carle | 91/243 X |
| 4,590,763 | 5/1986 | Augoyard et al. | 60/416 X |

FOREIGN PATENT DOCUMENTS

| | | |
|---|---|---|
| 1634824 | 2/1971 | Fed. Rep. of Germany . |
| 2008059 | 9/1971 | Fed. Rep. of Germany . |
| 2552336 | 8/1976 | Fed. Rep. of Germany . |
| 2623639 | 12/1977 | Fed. Rep. of Germany . |
| 2821339 | 11/1978 | Fed. Rep. of Germany . |

*Primary Examiner*—Larry Jones
*Attorney, Agent, or Firm*—William R. Hinds

[57] ABSTRACT

The working piston (15) in the cylinder (1) is acted upon by pressure fluid only on one side, while the return movement of the piston is produced by reaction forces (R). The pressure fluid feed and the pressure fluid discharge are effected by way of separate conduits (9, 10) so that there is a continuous interchange of pressure fluid in the cylinder (1). When the maximum piston stroke position is reached, pressure fluid can flow out of the cylinder (1), irrespective of the control position of the control device (2). In both limit positions of the piston (15), the movement of the piston is braked by a mechanical damping means (18).

15 Claims, 5 Drawing Figures

Figur: 2

Figur: 3

Figure 1:
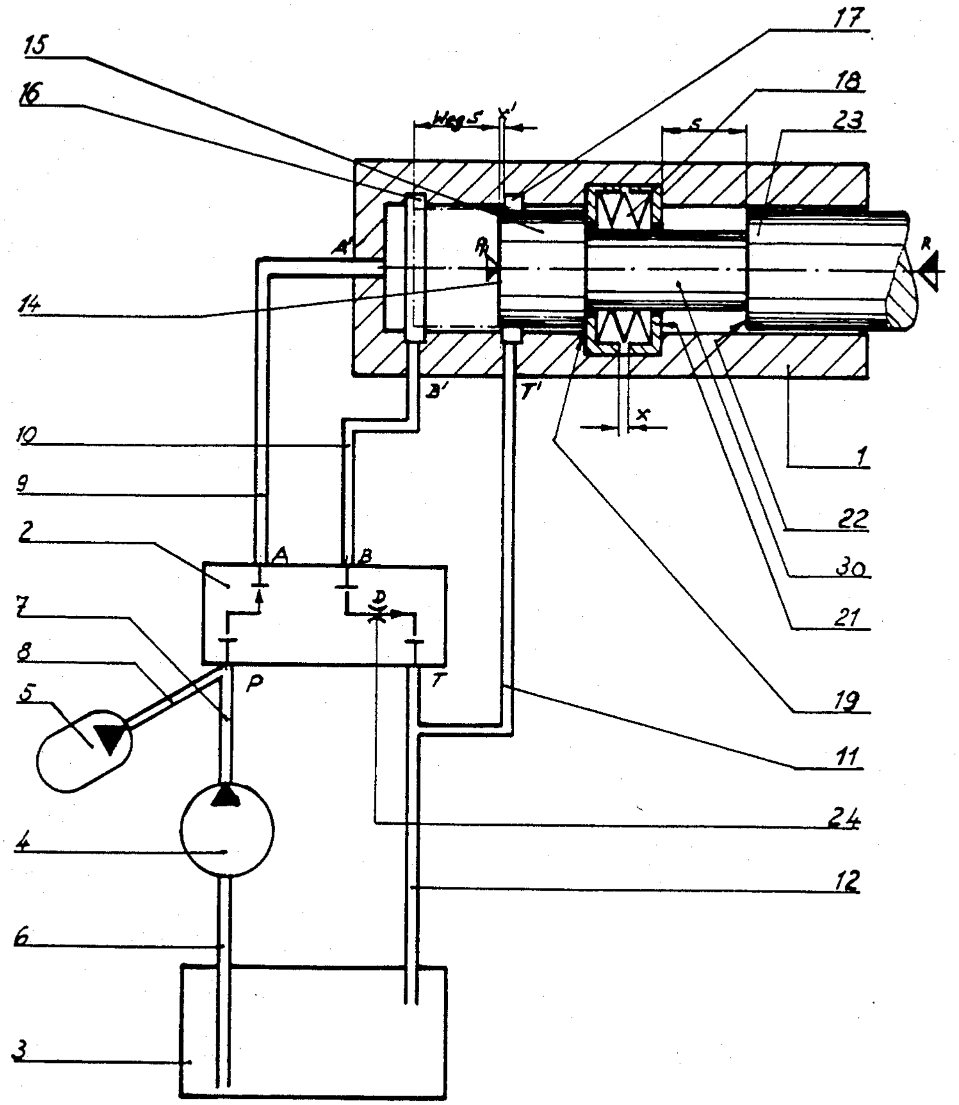

PROCESS AND APPARATUS FOR VIBRATORY OPERATION OF A WORKING PISTON, IN PARTICULAR FOR ACTIVE WORKING TOOLS

The invention relates to a process as set forth in the classifying portion of claim 1 and an apparatus as set forth in the classifying portion of claim 3.

Pulse-hydraulic processes and apparatuses of that kind are used in particular for operating the working tools in earth moving equipment such as for example total output-controlled excavators, skimmers, loaders and the like. Due to the vibratory movement of the tools, they can dig relatively easily into kinds of ground which are difficult to deal with. Particularly when dealing with chemically compacted or consolidated sands and shingles, hard coal and brown coal, coral, chalk, bedded limestone and in heterogeneous or weathered hard rocks, it is possible to use smaller working machines than was hitherto usual, as the degree of operating efficiency thereof is substantially enhanced by virtue of the pulse hydraulic arrangement.

DE-A No. 22 36 381; discloses a grab-type or loading shovel of an earth moving appliance, which at its forward edge has movably mounted teeth to which hydraulic actuating means are connected. The hydraulic actuating means are operated in a vibratory mode. In that arrangement, the teeth perform a shears-like movement. That shovel is suited primarily for operating in loamy or clayey grounds.

DE-C No. 19 57 469 discloses a pulse hydraulic means which can be used for vibratory operation of a working piston. That arrangement comprises a piston which is acted upon on both sides, in a cylinder. The two cylinder chambers in front of and behind the piston are connected to a control device which in its interior has a constantly rotating control slider which in a constantly changing sequence connects on the one hand the return conduit and on the other hand the feed conduit to the hydraulic cylinder, thereby causing a vibratory movement of the piston in the cylinder. The pulse frequency is altered in that arrangement by a change in the speed of rotation of the rotating control piston in the control device. By virtue of axial movement of the control piston, the pressure fluid can additionally be fed to the cylinder in different amounts, thereby making it possible to produce a vibratory sliding movement of the piston.

Finally, AT-A No. 368 607 discloses a similar apparatus wherein the piston is acted upon, only on one side. The piston is slidable in the cylinder against the force of a spring which, when the control device is in the appropriate position, produces a respective return movement of the piston. There is only a single conduit for the feed and discharge of the pressure fluid, between the control device and the hydraulic cylinder. Once again, that arrangement has a control device in the form of a rotary control piston which is also axially slidable for the purposes of controlling the amount of pressure fluid used.

The known processes and apparatuses suffer from various disadvantages. Thus for example in the known pulse-hydraulic cylinders, there is no continuous interchange in respect of the pressure fluid. On the contrary, it is always more or less the same pressure fluid that is moved with a reciprocating pulsating movement in the operating chambers of the cylinders. Because of the rapid increase in temperature, that has a disadvantageous effect on the resistance to aging of the pressure fluid and the sealing elements.

Another disadvantage of known apparatuses is that high pressure peaks occur at the moment at which the return flow of pressure fluid is closed off by the control device. Such pressure peaks may under some circumstances amount to a multiple of the fed pressure and may result in damage to the hydraulic system or possibly also the operating tool.

Finally, tests have shown that, particularly in regard to excavator buckets, it is difficult to apply a longitudinal movement to each individual tooth, without excessive technical expenditure. A problem is also raised by the vibratory forces which may be transmitted to the entire excavator by way of the bucket arm.

Therefore, a problem of the present invention is to provide a process and an apparatus of the kind set forth in the opening part of this specification, wherein the known disadvantages are avoided and wherein a tool which operates in a vibratory mode can be provided at minimum expenditure. Another problem of the present invention is to use a pulse-hydraulic apparatus in the optimum fashion in an earth moving appliance such as for example an excavator.

In regard to the process, that problem is solved by a process comprising the features recited in the characterising portion of claim 1.

The fact that the piston is returned by the reaction forces on the tool permits the cylinder to be of a particularly simple design. Because of that, the piston only needs to be subjected to the effect of pressure fluid on one side thereof, without an additional return means being required at the back of the piston. If the feed of pressure fluid from the control device to the cylinder or the discharge of pressure fluid from the cylinder to the control device respectively is effected by way of separate conduits, a pemanent interchange in respect of the pressure fluid may occur, in a particularly advantageous manner. As a result of that, the temperature of the pressure fluid rises only slightly, which has a positive effect on the resistance to aging.

In regard to the apparatus aspect, the above-specified problems are solved with an apparatus comprising the features recited in the characterising portion of claim 3. The pressure fluid is circulated in the working chamber of the cylinder, by way of the feed line and the return line. As reaction forces at the working tool are used for the purposes of the return movement of the piston, the return force is not controllable in every situation. Therefore, the maximum working stroke movement of the piston must be so restricted that no damaging pressure peaks or impacts can act on the piston. That is achieved in a particularly simple manner by means of the relief opening on the cylinder. As soon as the relief opening is exposed when the maximum piston stroke movement is achieved, pressure fluid can escape from the cylinder, by-passing the control device, so that there is no longer any thrust force being applied to the piston.

As the return forces caused by the working tool may be relatively high, it is necessary for the return movement of the piston to be damped in order to avoid the above-mentioned pressure peaks in the system. That is achieved in the simplest manner, from the design point of view, in that the feed conduit and the return conduit between the control device and the cylinder are communicatingly interconnected independently of the position of the piston, by way of the cylinder. That communication between the two conduits means that the volume of pressure fluid in the conduits can be used as a hydraulic damper as soon as the control device closes off the return conduit. The pressure fluid is compressed by the return force, thereby avoiding a pressure peak which occurs in a shock-like manner, in the system. At the same time, the compressed pressure fluid serves as a means for accelerating the piston for the reversal of the movement thereof, as soon as the control device opens the feed conduit.

The efficiency levels of the apparatus can be further optimized if the return conduit is throttled for the purposes of building up a pressure in the cylinder. In that way, a feed pressure which causes a forward movement of the piston is built up in the working chamber of the cylinder, independently of the constantly fluctuating external conditions such as for example the amount of pressure fluid, the temperature of the pressure fluid, the return force and so on.

Further protection for the piston, while additionally promoting the vibratory movement, can be achieved in that the piston can butt against a mechanical damping means, in both limit positions. In the case of high return forces on the piston therefore, the piston is damped mechanically and hydraulically. At the same time, the mechanical damping means also promotes the acceleration of the piston, against the return force. On the other hand, the piston is also subjected to a damping action in the reverse direction if for example the return force abruptly ceases, due to the working tool coming free, with the piston being exposed only to the hydraulic force.

If the relief opening in the cylinder can be exposed only against the resistance of the damping means, that provides in a particularly simple manner that the piston also vibrates when reaching its maximum piston stroke motion. As soon as the piston exposes the relief opening, even when the return conduit is closed, there is a drop in pressure in the cylinder so that, even when there is no return force, the piston is returned by the damping means so that the relief opening is closed off again. As soon as the control device opens the feed conduit, the damping means is compressed again or the relief opening is opened, so that the procedure is repeated.

A particularly advantageous design in respect of the damping means can be achieved by the damping means comprising two disc members which are loosely mounted on a reduced-diameter portion of the piston and between which there is disposed a spring element, wherein the axial movement of each disc member is restricted by an abutment disposed in the cylinder on the side remote from the spring element. The damping action is produced in that way in both directions, by virtue of the same spring element. In addition, the damping travel is of a equal magnitude in both directions. The damping travel between the two disc members can be restricted, in that arrangement, by at least one spacer member.

An advantageous use of an apparatus as described above, for an excavator bucket with vibratory teeth or tines, is characterised in accordance with the invention in that the hydraulic cylinder is flanged directly onto the control device, and the unit comprising the hydraulic cylinder and the control device is arranged in a double bottom structure underneath the bucket. By virtue of the control device and the hydraulic cylinder being directly assembled together, there are no unnecessary connecting conduits and the pressure pulses can be transmitted to the piston in the cylinder, virtually without pressure losses. That design also gives a short compact construction which can be easily disposed in the double bottom structure of the bucket. The fact that the hydraulic unit is mounted directly on the working tool also means that there are no complicated mechanical force transmission elements such as for example linkage arrangements and the like, which are susceptible to trouble. The excavator bucket itself is of greater mass, by virute of that arrangement, and that can also only have a positive effect, in operation of the assembly.

The excavator shovel operates in a particularly advantageous manner when it is provided with a substantially U-shaped mouth assembly whose limb portions are connected at their free ends in the upper region of the bucket, with the connecting portion between the limb portions on the front side thereof forming the cutting edge of the bucket and carrying the teeth, with the connecting portion in turn being pivotally connected to the piston. As the teeth to be moved are all jointly secured to the U-shaped mouth assembly, that arrangement avoids complicated individual mounting and guidance for the teeth. By virtue of the limb portions being pivotally mounted in the upper region of the bucket, the teeth do not perform a rectilinear movement but move over a path which is a portion of a circle. However, in operation of the bucket, that only has a positive effect as by virtue of that mode of operation, the ground which has been broken out is moved against the shell of the bucket.

It is possible to eliminate transverse forces on the piston, which can give rise to difficulties, if the connecting portion is connected to the piston by way of a joint member having two ball joints, of which one mounting cup means is secured to the piston and the other mounting cup means is secured to the connecting portion.

The design is particularly simple if a plurality of units comprising a hydraulic cylinder and a control device are disposed in a row under the bottom of the bucket, with the control devices being activatable by a common contro shaft. By virtue of having the common control shaft, all the control devices perform precisely the same control movement so that the cylinders always vibrate simultaneously at a uniform frequency.

Figure 2:
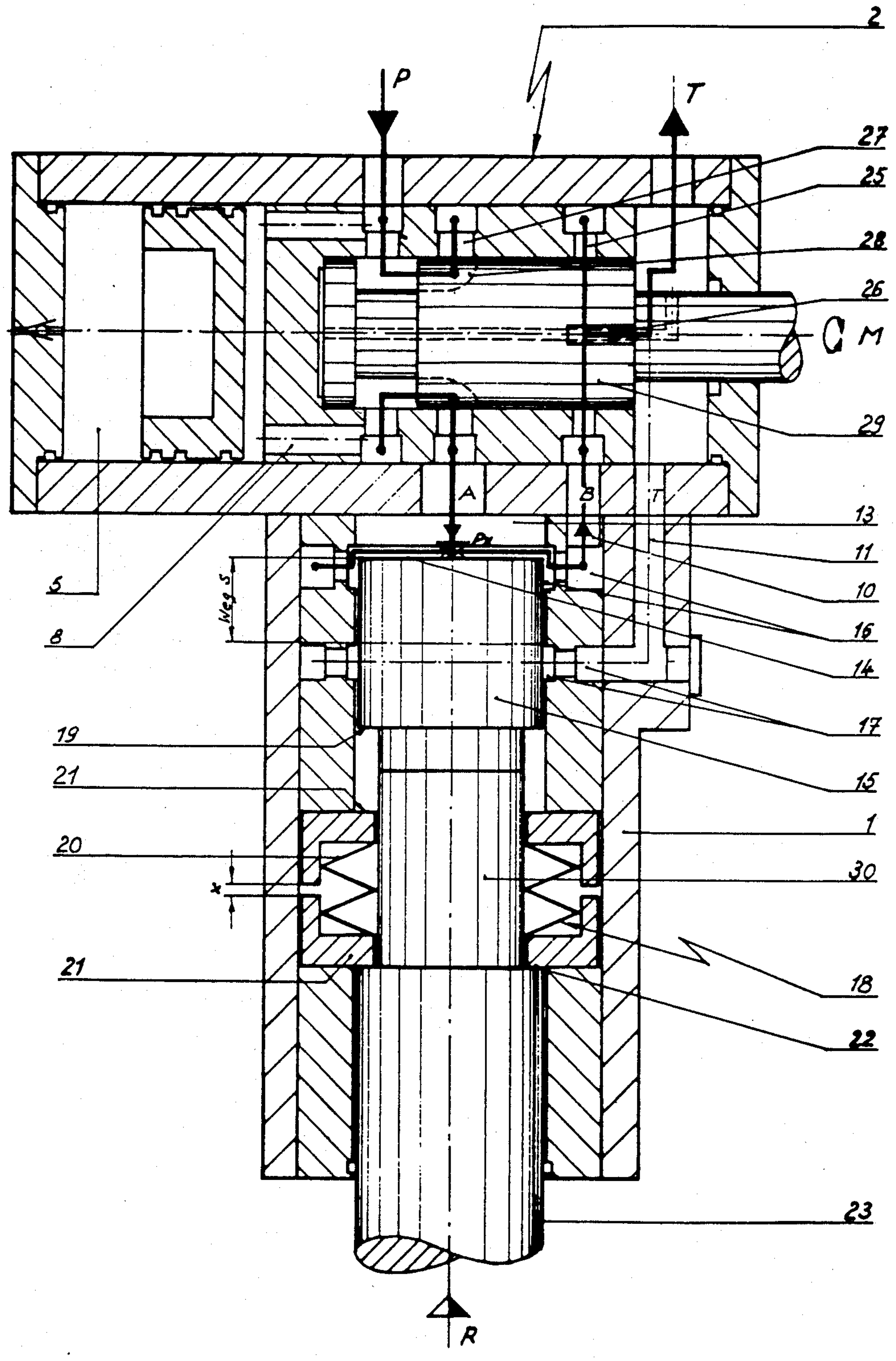
Figure 3:
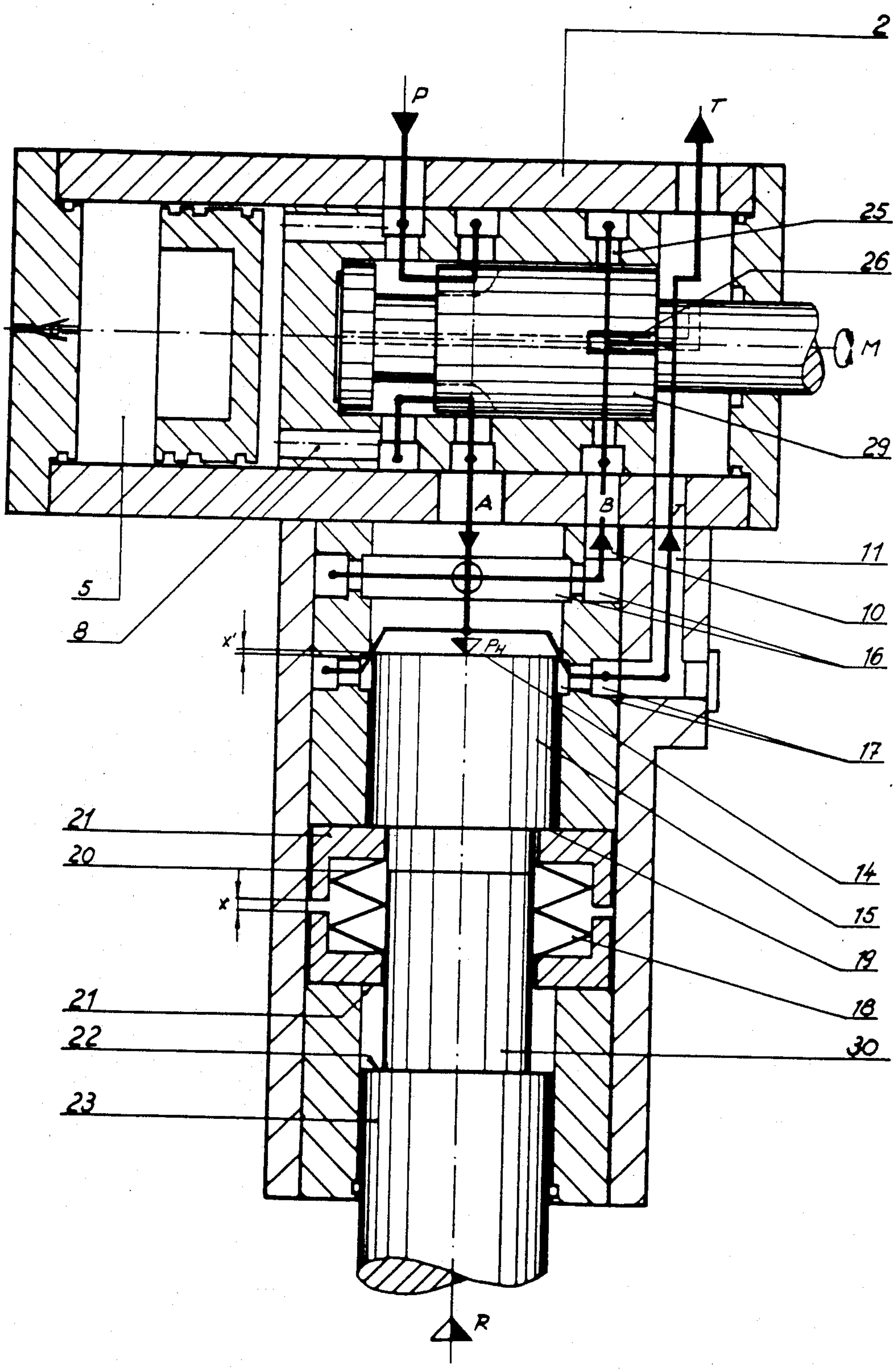
Figure 4:
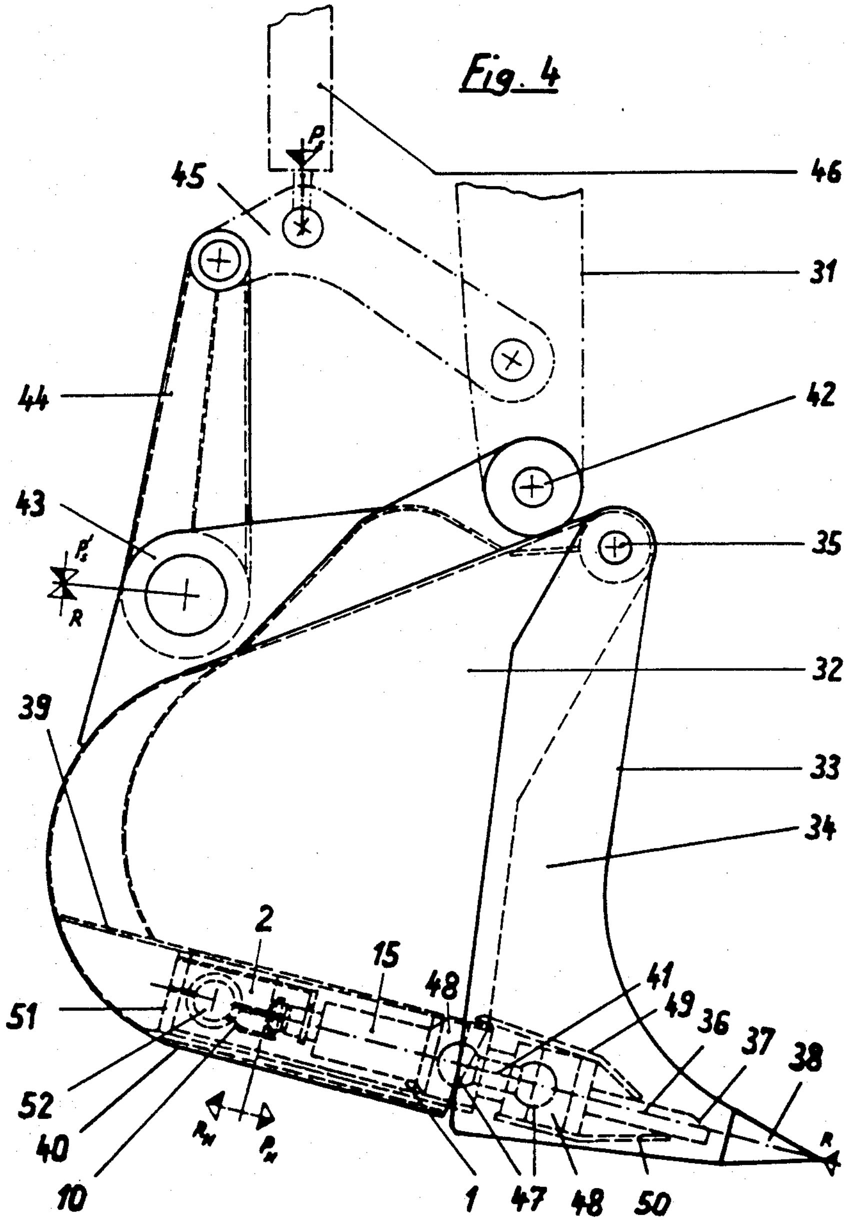
Figure 5:
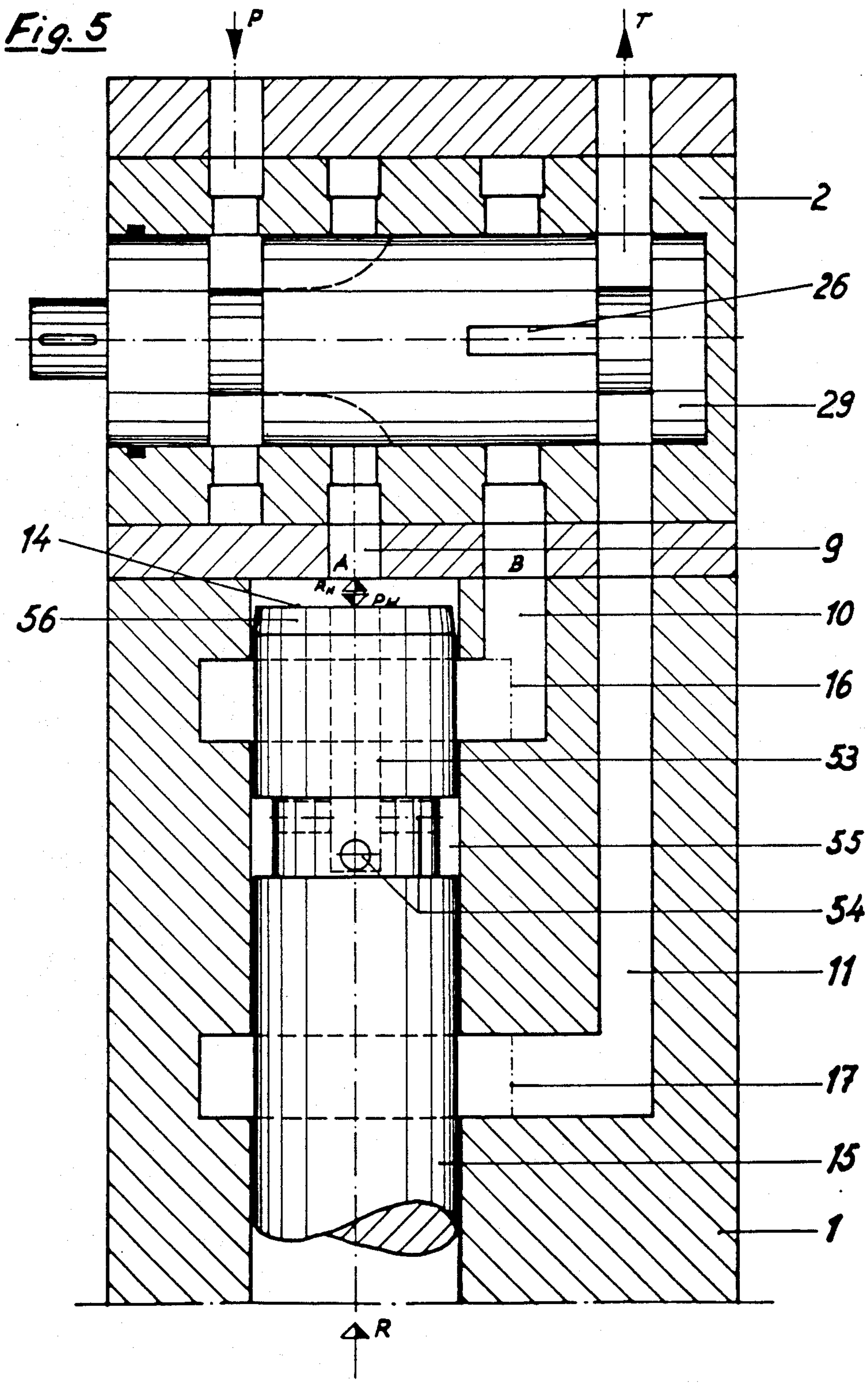

An embodiment of the invention is described in greater detail hereinafter and illustrated in the drawings in which:

FIG. 1 is a diagrammatic view of the hydraulic system comprising the control device and the cylinder, FIG. 2 shows a view in cross-section through a control device with a cylinder flanged thereon, with the piston in the returned position, FIG. 3 shows a view in cross-section as shown in FIG. 2, with the piston in the position of reaching the maximum stroke movement thereof, FIG. 4 shows the use of an apparatus according to the invention in an excavator shovel, and FIG. 5 shows a modified embodiment of a control device.

As shown in FIG. 1, a working piston 15 is movable in a hydraulic cylinder 1. The hydraulic cylinder 1 is connected to a control device 2 by way of a feed conduit 9 and a return conduit 10. The cylinder is supplied with pressure fluid by means of the pump 4 from a pressure fluid tank 3 by way of the section conduit 6 and the pressure conduit 7, the continuation of which, after the control device 2, is the feed conduit 9. Connected to the conduit 7 by way of a further pressure conduit 8 is a pressure-equalizing storage means or reservoir 5.

In the control device 2 which will be described in greater detail hereinafter, the hydrostatic pressure fluid flow is converted into a pulsating pressure fluid flow. The control device alternatingly closes and opens the feed conduit 9 and the return conduit 10 respectively. Therefore, when the feed conduit 9 is opened, a hydraulic thrust force $P_H$ acts on the end face 14 of the working piston 15. When the communication from P to A in the control device 2 is opened, the communication from B to T is closed. The thrust force $P_H$ thus produces a sliding movement of the piston 15 against the return force R which is a rection force on the working tool. As soon as the control device shuts off the feed conduit, that is to say, interrupts the communication from P to A, and immediately afterwards opens the communication from B to T in the control device, the return force R, if present, begins to return the piston 15 again. As a result of the return force R, the pressure fluid flows by way of the return conduit 10 and the control device 2 through the tank conduit 12 back into the pressure fluid tank 3. It will be seen that the above-indicated arrangement of the pressure fluid conduits provides for a continuous interchange of the pressure fluid, with each pressure pulse.

It will be seen that the movement performed by the piston 15 in the cylinder 1 is dependent on the return force R. If there is no return force R, the piston 15 is moved by the hydraulic thrust forces $P_H$ over the entire piston stroke motion S. In that position, the piston 15 first butts against a mechanical damping means 18. If the piston 15 is moved on by the distance X' against the force of the damping means 18, the piston 15 opens a relief opening 17 which is arranged in the form of an annular groove in the cylinder 1. By way of the relief opening 17, pressure fluid can flow back through the relief conduit 11 directly into the tank conduit 12, bypassing the control device 2. As a result of that, the pressure in the cylinder 1 is reduced, irrespective of the control position of the control device 2, so that the piston 15 is moved back again, even without the return force R, by virtue of the force of the damping means 18. When that occurs, the relief opening 17 is closed off again so that a hydraulic thrust force $P_H$ can again act on the piston as soon as the control device 2 opens the feed conduit 9. It will be seen therefore that that arrangement also provides a vibratory movement of the piston even when there is no return force at all or even when the return force is permanently smaller than the hydraulic force $P_H$. At the same time, the above-described arrangement limits the maximum piston travel by hydraulic means, while shock-like loadings are prevented by the damping means 18.

A throttle 24 in the return conduit between the cylinder 1 and the pressure fluid tank 3 produces an increase in pressure in the cylinder 1 even when the communication from B to T in the control device 2 is open, thereby avoiding an abrupt return movement of the piston 15, when subject to high return forces R.

Reference will now be made to FIGS. 2 and 3 to describe details of the control device 2 and the hydraulic cylinder 1. In that connection, FIGS. 2 shows the flow of pressure fluid in the system at the beginning of a working operation, that is to say, when the piston 15 is in the return position. The control device 2 is flanged directly onto one end of the hydraulic cylinder 1. In the illustrated embodiment, the control device 2 operates in accordance with the per se known principle of a rotary slide valve unit.

In that arrangement, a rotor 29 which is driven by a drive means not shown in greater detail herein rotates at a given speed which determines the frequency of the hydraulic pulses. Provided in the rotor 29 are feed pockets or recesses 28 and return pockets or recesses 26 which, depending on their respective positions, open and close inlet bores 27 and outlet bores 25 in the housing of the control device 2. In FIG. 2, the feed pockets 28 open the inlet bores 27 while the rotor 29 closes off the outlet bores 25, as the return pockets 26, in that position, are disposed substantially transversely with respect to the axis of the outlet bores 25. By virtue of that positioning, the communication P to A is opened so that the end face 14 of the piston 15 is acted upon the pressure fluid. It will be appreciated that another control device could also be used, instead of the rotary slide valve principle. For example, the control device could have a control slide member which does not rotate but which performs an exclusively axial movement.

The piston itself comprises an actual working piston 15 and a guide piston 23. A portion 30 of reduced diameter is disposed between the working piston 15 and the guide piston 23. Two plate or disc members 21 are axially displaceably mounted on the reduced-diameter portion 30 and disposed between the two members 21 is a spring element 20 which presses the two members 21 away from each other. On the side remote from the spring element 20, each disc member 21 has an abutment means in the cylinder 1, against which they are pressed by the spring element 20. The disc members 21 and the spring element 20 thus form in a very simple manner a mechanical damping means 18 against which either the annular surface 19 of the working piston or the annular surface 22 of the guide piston can bear. Spacer elements are provided to protect the spring element 20 and to restrict the damping travel X. The spacer elements preferably comprise an annular wall portion which is disposed on each disc member, so that each disc member is of the configuration of a cup-like component. Other spacer elements however can obviously be envisaged.

At its side which is towards the control device 2, the hydraulic cylinder 1 is provided with an annular groove 16. The annular groove 16 communicates by way of the return conduit 10 with the outlet bores 25 in the control device. The annular groove 16 is arranged in such a way that, even when the piston 15 is in the entirely set-back position, there is a communication between the feed conduit 9 and the return conduit 10. The annular groove 16 can also be omitted if it is not required for reasons of increasing the damping chamber 13. The outlet bores 25 are of reduced diameter, in comparison with the inlet bores 27, so that they act as a throttle means in the flow of pressure fluid.

A further annular groove in the cylinder 1 communicates with a relief opening 17 which however is exposed only when the end face 14 has covered the entire piston stroke distance X and when the piston 15 is then additionally moved against the force of the damping means 18. The relief opening 17 carries pressure fluid by way of the vent conduit 11 directly back into the pressure fluid tank, independently of the control position of the control device 2.

As soon as the rotor 29 opens the communication P to A, pressure fluid is caused to act on the piston 15. If the hydraulic thrust force $P_H$ is greater than the return force R, then the piston 15 is moved against the return force R. That movement is continued until the rotor again shuts off the communication from P to A. The piston 15 is now returned by the return force R, by the rotor 29 opening the communication from B to T so that the pressure fluid can flow back into the pressure fluid tank by way of the return conduit 10. In that way, a vibrating movement is generated at the piston 15, with the frequency of the vibratory movement being dependent on the speed of rotation of the rotor 29.

When the pressure fluid return is closed off, that is to say, when the communication from B to T is interrupted, the piston 15 which is moved back by the return force R is braked by the pressure fluid as pressure fluid can no longer flow away, through the return conduit 10. That deceleration effect is hydraulically damped by compression of the pressure fluid. By virtue of the communication between the feed conduit and the return conduit, the volume of pressure fluid that can be compressed is relatively large. The volume of pressure fluid can be further increased by means of a damping chamber 13. The compressed pressure fluid serves at the same time as an accelerating means for reversing the movement of the piston, as a result of the depressibility of the pressure fluid. The pressure fluid which then flows in through the inlet bores 27 can thus be converted into work in the optimum fashion.

Further damping in respect of the return force R is also provided by the mechanical damping means 18 which can still be compressed by the damping distance X before the piston comes into an entirely abutted position. In this case also, the relief of the stress in the damping means 18 assists the reversal of the movement of the piston, against the return force R.

In the event of a predominant hydraulic thrust force $P_H$, when there are no compensating return forces R, the piston 15 covers the entire piston stroke distance S until the annular surface 19 of the working piston bears against the disc member 21 of the damping means 18, that is towards the working piston. FIG. 3 shows the working piston 15 in that position. The end face 14 of the piston 15 is so arranged relative to the relief opening 17 that, with the working piston 15 in a position of bearing against the damping means, the relief opening 17 still just remains closed. As soon as the end face 14 of the piston is moved on by the distance X' by virtue of the hydraulic force $P_H$, against the spring force of the damping means, a portion of the pressure fluid can flow directly by way of the relief opening 17 and the relief conduit 11 back to the pressure fluid tank 3, by-passing the control device 2, that is to say, independently of the control position of the rotor 29. The stroke movement of the piston 15 is restricted in that way. As, in the event of unimpeded discharge of pressure fluid by way of the relief opening 17, the damping means 18 urges the piston back again, the piston 15 moves with a vibratory movement into its limit position, even without a return force R.

FIG. 4 shows a particularly advantageous use of the above-described pulse hydraulic assembly in relation to an excavator bucket. An excavator bucket 32 is secured to a bucket arm 31, on a arm joint 42. Arranged in front of the bucket 32 is a substantially U-shaped mouth assembly 33 which has two lateral limb portions 34. The limb portions 34 are pivotally secured in the upper region of the bucket, at their upper free ends, by joints 35. At their lower ends, the two limb portions 34 are connected together by a connecting portion 36 which on the one hand forms the bucket cutting edge 37 and which on the other hand carries the teeth 38.

The bucket 32 has a double bottom structure comprising an upper sheet metal member 39 and a lower sheet metal member 40. Disposed in the double bottom structure are the control device 2 and the hydraulic cylinder 1 which form a respective unit. Depending on the width of the excavator bucket, a plurality of such units may be disposed in a row, one behind the other. Force is transmitted from the piston 15 to the connecting portion 36 of the mouth assembly 33 by way of a joint member 41. The member 41 has two ball joints 47, wherein one ball mounting cup means 48 is disposed on the piston 15 and a second ball mounting cup means 48' is arranged on the connecting portion 36. That pivotal connection provides for satisfactory transmission of the vibratory forces from the piston 15 to the mouth assembly 33 even if the latter tilts or shifts under the effect of maximum loads and resistance to penetration. Therefore, there is no need to take particular steps to stabilize the piston 15.

It will be seen that the teeth 38 on the mouth assembly 33 do not perform a precisely rectilinear movement. On the contrary, the teeth 38 move about the axis of the joint 35. An upper sheet metal masking member 49 and a lower sheet metal masking member 50 on the connecting portion 36 ensure that the material which is cut out by the cutting edge 37 transfers satisfactorily into the interior of the bucket 32. The unit comprising the control device and the hydraulic cylinder 1 bears rearwardly against a support means 51.

The bucket is not only connected to the bucket arm 31 at the arm joint 42, but is also connected to the lever arm 44 and the elbow lever 45 at the bucket joint 43. The lever 45 is engaged by a bucket cylinder 46 for applying the power for pivoting the bucket about the arm joint 42. The bucket joint 43 is mounted in a metal-rubber element as that part of the arrangement is subjected to the action of reaction forces originating from the vibratory movement of the mouth assembly. Reaction forces and forces exerted by the bucket cylinder 46 are simultaneously transmitted here by way of the bucket joint 43. It has been found particularly advantageous for the lever arm 44 to extend substantially parallel to the bucket arm 31, with the bucket 32 in the basic position.

FIG. 5 shows a modified embodiment of a control device wherein in particular the cylinder 1 and the piston 15 are of a different configuration. The piston is provided with a central bore 53 which leads from the end face 14 to a position at the level of an annular groove 55 in the piston. The annular groove in the piston and the central bore intercommunicate by way of communicating bores 54 which extend transversely relative to each other. In that way, the same pressure obtains in the annular groove 55 in the piston, as in front of the end face 14 of the piston. Pressure relief and thus limitation in respect of the maximum stroke movement of the piston occur as soon as the annular groove 55 of the piston reaches the relief opening 17. The pressure fluid then also flows back by way of the relief conduit 11. This construction permits the relief opening 17 to be set back, which may be advantageous from the point of view of the structural length of the piston.

In the illustrated embodiment, the piston, when moved back, closes off the return conduit 10 or the annular groove 16. In order also in this case to produce a certain damping action, the front end of the piston is provided with a conical facet or bevel portion 56 which prevents the return conduit from being abruptly closed off. It will be appreciated that this embodiment may also be provided with a damping means.

We claim:

1. In a process for vibratory operation of a working piston (15) for hydraulic tools and the like, which is displaceable with a reciprocating motion over a given working stroke movement in a cylinder (1), with a control device which allows pressure fluid into and out of the cylinder in rapid succession, the improvement characterised in that only one side of the working piston (15) is acted upon by pressure fluid and that the return movement of the piston is effected by reaction forces on the tool, wherein in the absence of reaction forces or when the maximum working stroke movement of the piston is reached pressure fluid is discharged from the cylinder (1), by-passing the control device (2).

2. A process according to claim 1 characterised in that the pressure fluid feed from the control device (2) to the cylinder (1) and the pressure fluid discharge from the cylinder (1) to the control device (2) respectively are effected by way of separate conduits (9, 10).

3. In apparatus for producing a vibratory movement at a working piston (15) which is displaceable in a cylinder (1), with a pulse-generating control device (2) which lets pressure fluid into and out of the cylinder in rapid succession, the improvement characterised in that a feed conduit (9) leads from the control device (2) to the cylinder (1) for pressure fluid actuation of the piston (15) on only one side thereof, that a return conduit (10) leads from the cylinder to the control device (2), from the same side of the piston, wherein said conduits (9, 10) can be alternatingly opened and closed by the control device (2), and that arranged on the cylinder (1) is a relief opening (17) which is exposed when the maximum piston stroke movement is reached and by way of which pressure fluid can be drained from the cylinder (1) independently of the control position of the control device.

4. Apparatus according to claim 3 characterised in that the feed conduit (9) and the return conduit (10) between the control device (2) and the cylinder (1) are communicatingly interconnected independently of the piston position by way of the cylinder (1).

5. Apparatus according to claim 4 characterised in that the return conduit (10) is throttled for building up a pressure in the cylinder (1).

6. Apparatus according to claim 5 characterised in that the piston is capable of butting against a mechanical damping means (18) in both limit positions.

7. Apparatus according to claim 6 characterised in that the relief opening (17) in the cylinder (1) can be exposed only against the resistance of the damping means (18).

8. Apparatus according to claim 7 characterised in that the damping means (18) comprises two disc members (21) which are loosely mounted on a portion (30) of the piston which is of reduced diameter, with a spring element (20) being arranged between the two disc members (21), wherein the axial movement of each disc member is restricted by an abutment arranged in the cylinder on the side remote from the spring element.

9. Apparatus according to claim 8 characterised in that the damping travel (X) between the two disc members (21) is restricted by at least one spacer member, for the purposes of protecting the spring element (20).

10. Apparatus according to claim 3 in combination with an excavator bucket having vibratory teeth, characterised in that the hydraulic cylinder (1) is flanged directly onto the control device (2) and that the unit comprising the hydraulic cylinder and the control device is arranged in a double bottom configuration (39) beneath the bucket (32).

11. Apparatus according to claim 10 characterised in that the bucket (32) is provided with a substantially U-shaped mouth assembly (33), the limb portions (34) of which are pivotally connected at their free ends in the upper region of the bucket, that the connecting portion (36) between the limb portions (34) at the front side forms the bucket cutting edge (37) and carries the teeth (38), and that the connecting portion (36) is in turn pivotally connected to the piston (15).

12. Apparatus according to claim 11 characterised in that the connecting portion (36) is connected to the piston (15) by way of a joint member (41) having two ball joints (47) of which one bearing cup means (48) is fixed to the piston and the other bearing cup means (48') is secured to the connecting portion.

13. Apparatus according to claim 12 characterised in that a plurality of units comprising a hydraulic cylinder (1) and a control device (2) are arranged in a row under the bottom of the bucket and that the hydraulic cylinders can be activated synchronously or asynchronously by way of a common control shaft (52) in the control devices (2).

14. Apparatus according to claim 3 characterised in that the control device (2) has separate openings for connecting the feed conduit (9) with a pressure source (4) and for connecting the return conduit (10) with a pressure medium tank (3) respectively.

15. Apparatus acocrding to claim 14 characterised in that the control device (2) is a rotary slide valve and the separate openings are feed pockets (28) and return pockets (26) which are arranged axially displaced to each other on the rotor (29).

* * * * *